Patented Apr. 30, 1940

2,198,701

UNITED STATES PATENT OFFICE 2,198,701

PRODUCTION OF NEW AZO DYESTUFFS CONTAINING CHROMIUM

Hans Kaemmerer and Ludwig Neumann, Mannheim, and Robert Schweizer, Ludwigshafen-on-the-Rhine, Germany, assignors to General Aniline & Film Corporation, a corporation of Delaware No Drawing. Application July 11, 1939, Serial No. 283,826. In Germany July 21, 1938

6 Claims. (Cl. 260—151)

The present invention relates to new azo dyestuffs containing chromium.

We have found that new azo dyestuffs containing chromium are obtained by coupling diazo compounds of arylamines containing a hydroxy or alkoxy group in ortho-position to the amino group with nitro derivatives of 1-amino-8-hydroxy-naphthalene sulphonic acids and treating the azo dyestuffs obtained with agents capable of yielding chromium.

The said nitro compounds are obtained by treatment of 1-amino-8-hydroxynaphthalene sulphonic acids with mixtures of nitric acid and sulphuric acid. As diazo components there may be mentioned 1-amino-2-hydroxybenzenes or orthohydroxyaminonaphthalenes, as for example 1-amino-2-hydroxybenzene, and in particular the halogen and nitro substitution products derived therefrom, and the 1-amino-2-alkoxy compounds corresponding thereto. Diazo components containing sulphonic acid groups may also be used.

The new dyestuffs yield violet-blue dyeings on wool from an acid bath, the dyeings changing to olive-green by afterchroming. The chromium compounds prepared in substance dye wool fast, usually yellow-green shades. The new dyestuffs are of special value for dyeing chrome and glacé leather. Deep dyeings, usually of deep green shades, are obtained thereon. As compared with the corresponding dyestuffs with 1-amino-8-hydroxynaphthalene sulphonic acids free from nitro groups, the new dyestuffs have the advantage that they are stable to mineral acids. Moreover the nitro groups effect an increase in the color strength and a displacement of the shade towards yellow, so that quite new shades of color are obtained. The new dyestuffs have a very good fastness to washing and light and an excellent levelling power.

The complex chromium compounds may be prepared in substance according to usual methods by heating the dyestuffs with compounds of trivalent chromium with or without pressure.

The following examples will further illustrate how this invention may be carried out in practice but the invention is not restricted to these examples. The parts are by weight, unless otherwise specified.

Example 1

125 parts of 34.5 per cent caustic soda solution which have first been diluted with water are added to 284 parts of 1-amino-7-nitro-8-hydroxynaphthalene-5-sulphonic acid (obtained by nitrating commercial 1-amino-8-hydroxynaphthalene-5-sulphonic acid in concentrated sulphuric acid), the diazo compound of 199 parts of 2-amino-4.6-dinitro-1-hydroxybenzene, prepared in known manner, is added, a solution of 272 parts of crystallized sodium acetate is allowed to run in and then a solution of 212 parts of anhydrous sodium carbonate is run in slowly. After several hours, the dyestuff is formed; it is salted out in the usual way. It dyes wool dark blue shades which change to olive-green-brown by afterchroming on the fibre.

For the preparation of the chromium compound in substance, the dyestuff is heated with a formic acid solution of 76 parts of chromium oxide for 3 hours under reflux at 100° C. The violet color gradually changes to green. The dyestuff separated by salting out yields on chrome and glacé leather deep green shades of excellent fastness properties. If the chroming be carried out under pressure at 133° C., a dyestuff giving a black-brown dyeing is obtained.

For the dyeing of chrome leather, the procedure may for example be as follows: 10 grams of chrome calf leather are deacidified for 30 minutes with 1.5 per cent borax solution and rinsed for about 10 minutes. The piece thus prepared is then brought into a dyebath prepared by dissolving 0.1 gram of dyestuff in 60 cubic centimetres of water. Dyeing is effected for 20 minutes neutral at 60° C. while continually moving the bath. It is then fatted with neat's-foot oil or another grease usual for this purpose. It is then dyed for another 30 minutes rinsed for a short time, stretched and dried. In order to render the leather supple, it is brought into moist sawdust for 2 hours, then pegged out and stretched until it is dry.

Example 2

The diazo compound of 199 parts of 2-amino-4.6-dinitro-1-hydroxybenzene is coupled in the manner described in Example 1 with 284 parts of 1-amino-7-nitro-8-hydroxynaphthalene-4-sulphonic acid (prepared by nitrating 1-amino-8-hydroxynaphthalene-4-sulphonic acid in concentrated sulphuric acid). The dyestuff gives on wool dull violet shades which change to olive-green by afterchroming on the fibre.

The chromium compound of the dyestuff, obtained by treating with a formic or sulphuric acid solution of 76 parts of chromium oxide between 100° and 133° C., yields on wool and on leather deep green, uniform shades which are fast to acids, light and washing.

By using the nitro compound of 1-amino-8- hydroxynaphthalene-3,6- or -4,6-disulphonic acid, there are obtained dyestuffs which, by heating with salts of trivalent chromium, yield complex chromium compounds dyeing wool and leather fast, clear green shades.

Example 3

The diazo compound of 199 parts of 2-amino-4,6-dinitro-1-hydroxybenzene is coupled in the manner described in Example 1 with 284 parts of 1-amino-5-nitro-8-hydroxynaphthalene-7-sulphonic acid (obtainable by nitration of the 1-amino-8-hydroxynaphthalene-7-sulphonic acid which is obtainable according to the German specification No. 82,900). The dyestuff may be converted into the chromium compound by heating with salts of trivalent chromium with or without pressure in the manner described in the foregoing examples. The dyeings on leather and on wool are deep green and have good tinctorial properties.

Dyeings on glacé leather may be produced for example in the following manner: 5 grams of chromed glacé leather are deacidified with 1.5 per cent borax solution, rinsed for 5 minutes and brought into a dyebath containing 0.25 gram of dyestuff in 100 grams of water. It is then dyed for from 1 to 2 hours at 60° C. without additions, while continually moving the bath, until the leather is dyed through. It is then fatted with egg yolk and further worked for 30 minutes. 5 percent of acetic or formic acid are then added and the leather again dyed for 30 minutes. Finally 1 per cent of chromium acetate is added and the dyeing continued for an hour. The leather is then rinsed for a short time, stretched, dried, treated with sawdust, pegged out and again dried.

Example 4

154 parts of 4-nitro-2-amino-1-hydroxybenzene are diazotized in known manner and the azo dyestuff is prepared in the manner described in Example 1 with 284 parts of 1-amino-7-nitro-8-hydroxynaphthalene-4-sulphonic acid.

If the dyestuff be treated while hot with chromium formate, a chromium compound is obtained which dyes chrome leather dark green shades fast to washing.

Example 5

The diazo compound prepared from 188.5 parts of 4-chlor-6-nitro-2-amino-1-hydroxybenzene is coupled in the manner described in Example 1 with 284 parts of 1-amino-7-nitro-8-hydroxynaphthalene-4-sulphonic acid. The dyestuff formed is isolated and heated for 3 hours at 130° C. with a formic acid solution of 80 parts of chromium oxide. The complex chromium compound of the dyestuff is salted out and dried. It dyes glacé leather deep green fast shades.

Similar dyestuffs are obtained by using under otherwise identical conditions the diazo compounds prepared from 6-chlor-4-nitro-2-amino-1-hydroxybenzene or from 4-chlor-5-nitro-2-amino-1-hydroxybenzene.

Example 6

The diazo compound prepared from 234 parts of 4-nitro-2-amino-1-hydroxybenzene-6-sulphonic acid is coupled in the manner described in Example 1 with 284 parts of 1-amino-7-nitro-8-hydroxynaphthalene-4-sulphonic acid. The dyestuff formed is isolated and boiled for 2½ hours under reflux with a formic acid solution of 80 parts of chromium formate. From the solution thus obtained the formic acid is distilled off. The solid dyestuff obtained dyes chrome and glacé leather dark green shades which are fast to washing and to acids.

What we claim is:

1. Complex chromium compounds of azo dyestuffs of the following formula A—N=N—B wherein A stands for an aromatic radicle selected from the benzene and naphthalene series containing a hydroxy group in ortho-position to the azo group shown, and wherein B stands for the radicle of a 1-amino-8-hydroxynaphthalene sulphonic acid containing a nitro group.

2. Complex chromium compounds of azo dyestuffs of the following formula A—N=N—B wherein A stands for a monocyclic radicle of the benzene series containing a hydroxy group in ortho-position to the azo group shown, and wherein B stands for the radicle of a 1-amino-8-hydroxynaphthalene sulphonic acid containing a nitro group.

3. Complex chromium compounds of azo dyestuffs of the following formula A—N=N—B wherein A stands for a monocyclic radicle of the benzene series containing at least one nitro group and containing a hydroxy group in ortho-position to the azo group shown, and wherein B stands for the radicle of a 1-amino-8-hydroxynaphthalene sulphonic acid containing a nitro group.

4. Complex chromium compounds of azo dyestuffs of the following formula A—N=N—B wherein A stands for a monocyclic radicle of the benzene series containing at least one nitro group and containing a hydroxy group in ortho-position to the azo group shown, and wherein B stands for the radicle of 1-amino-7-nitro-8-hydroxynaphthalene-5-sulphonic acid.

5. Complex chromium compounds of azo dyestuffs of the following formula A—N=N—B wherein A stands for a monocyclic radicle of the benzene series containing at least one nitro group and containing a hydroxy group in ortho-position to the azo group shown, and wherein B stands for the radicle of 1-amino-7-nitro-8-hydroxynaphthalene-4-sulphonic acid.

6. Complex chromium compounds of azo dyestuffs of the following formula A—N=N—B wherein A stands for a monocyclic radicle of the benzene series containing at least one nitro group and containing a hydroxy group in ortho-position to the azo group shown, and wherein B stands for the radicle of 1-amino-5-nitro-8-hydroxynaphthalene-7-sulphonic acid.

HANS KAEMMERER.
LUDWIG NEUMANN.
ROBERT SCHWEIZER.